(12) United States Patent
Mase (10) Patent No.: US 7,281,406 B2
(45) Date of Patent: *Oct. 16, 2007

(54) SENSOR SYSTEM (75) Inventor: Shunji Mase, Handa (JP)

(73) Assignee: DENSO Corporation, Kariya (JP)

( * ) Notice: Subject to any disclaimer, the term of this patent is extended or adjusted under 35 U.S.C. 154(b) by 269 days.

This patent is subject to a terminal disclaimer.

(21) Appl. No.: 11/085,109

(22) Filed: Mar. 22, 2005

(65) Prior Publication Data

US 2005/0217375 A1    Oct. 6, 2005

(30) Foreign Application Priority Data

Mar. 30, 2004    (JP) .............................. 2004-100893

(51) Int. Cl.
*G01P 21/00* (2006.01)
*G01P 9/04* (2006.01)
(52) U.S. Cl. .................. 73/1.37; 73/504.04; 73/504.12
(58) Field of Classification Search ................. 73/1.37, 73/1.38, 504.04, 504.12, 510
See application file for complete search history.

(56) References Cited

U.S. PATENT DOCUMENTS 6,796,177 B2    9/2004    Mori 7,031,852 B2 *    4/2006    Kato ........................ 73/504.12
2005/0216149 A1 *    9/2005    Kato ............................ 701/29

FOREIGN PATENT DOCUMENTS

JP    B2-2504233    7/1991
JP    A-2001-153659    6/2001

\* cited by examiner

*Primary Examiner*—John E. Chapman
(74) *Attorney, Agent, or Firm*—Posz Law Group, PLC

(57) ABSTRACT

In a sensor system, a detection waveform-forming unit detects a vibration component and forms a waveform of a detected angular velocity based on the vibration component. Components of the waveform are of opposite phases relative to each other and acceleration waveform components are in phase relative to each other. An acceleration signal-forming unit operates on the waveform to cancel the waveform of opposite phases to each other, and produces a second kind acceleration signal. An abnormal condition-detecting unit detects an abnormal condition in either the angular velocity sensor unit or an acceleration sensor unit provided separately based on the second kind acceleration signal and a first kind acceleration signal.

11 Claims, 3 Drawing Sheets

SENSOR SYSTEM

CROSS REFERENCE TO RELATED APPLICATION

This application is based upon, claims the benefit of priority of, and incorporates by reference the contents of, Japanese Patent Application No. 2004-100893 filed on Mar. 30, 2004.

FIELD OF THE INVENTION

The present invention relates to a sensor system for controlling vehicles and, more particularly, to such a sensor system including a vibration-type angular velocity sensor and an acceleration sensor, and having abnormal condition detection capability.

BACKGROUND OF THE INVENTION

Angular velocity sensors (gyro sensors) such as mechanical type utilizing the precession of a rotary body, optical type utilizing a change in the timing for receiving a laser beam circulating in a housing caused by the turn of the housing, and fluid type which injects a gas for sensing onto a heat ray in a housing and detects a change in the amount of injection caused by the turn of the housing relying upon the temperature of the heat ray are generally known. Recently, demand has been rapidly increasing for angular velocity sensors used in car navigation systems for detecting the vehicle direction. Further, a vibration-type angular velocity sensor which is inexpensive and light in weight in comparison to the above-mentioned sensors is now commonly being used. The vibration-type angular velocity sensor detects a vibration component (hereinafter also called angular velocity vibration component) when an angular velocity acts upon a vibrator which vibrates in a predetermined reference direction based on the Coriolis' force in a detection direction perpendicular to the reference direction, and produces the angular velocity data based on the vibration component.

Conventional systems for controlling the vehicles utilize the angular velocity sensor in, for example, a vehicle stabilizing control system for maintaining the vehicle in a normal state by detecting transverse skidding of the vehicle and providing optimum control of wheel braking and torque, and a four wheel steering control system which controls the steering angle of the rear wheels or the front wheels of the vehicle. In such systems, an abnormal condition of the vehicle such as the transverse skidding of the vehicle is detected by relying upon angular velocity signals from the angular velocity sensor. Therefore, highly reliable angular velocity signals have been demanded.

One example of the above described conventional system is disclosed in JP-A-2001-153659. In this system, when the driving amplitude of the vibrator goes out of a specified range in the vibration-type angular velocity sensor, abnormal condition occurs at the zero point in the angular velocity sensor output and in the sensitivity. By detecting the driving amplitude, therefore, it is judged whether the driving amplitude is lying within the specified range. Further, when a large shock is imparted to the vehicle when, for example, the vehicle hits a curb, a large shock is also imparted to the angular velocity sensor mounted on the vehicle. In this case, the signal is saturated in the processing circuit of the angular velocity sensor due to the shock, often producing a signal different from the correct angular velocity (yaw rate). Therefore, the system determines that an abnormal condition is occurring in the vehicle control system when the signal of the angular velocity sensor exceeds a predetermined level. Concretely speaking, the driving amplitude of the vibrator is detected by a piezoelectric element and is converted into a charge voltage and is, further, rectified to use a DC signal thereof as an amplitude monitoring signal. An abnormal condition can be detected by checking whether the level of the amplitude monitoring signal is lying within the specified range.

Recently, in order to meet the demands for miniaturization, the piezoelectric vibrator has been replaced by a semiconductor capacitance type vibrator which detects the vibration by capitance change. However, the zero point and sensitivity of this angular velocity sensor is affected by the adhesion of even tiny foreign matters. Therefore, the sensor can not meet the satisfied requirements for detecting the abnormal vibration amplitude of the vibrator and abnormal condition thereof due to disturbance.

SUMMARY OF THE INVENTION

It is an object of the present invention to provide a sensor system incorporating a vibration-type angular velocity sensor and an acceleration sensor, which is capable of more correctly detecting abnormal conditions in the sensors and can be used for controlling the vehicles.

In order to achieve the above object, a sensor system comprises an angular velocity sensor unit having vibrators which vibrate in a predetermined reference direction and a detection waveform-forming unit which detects a vibration component in a predetermined direction for detecting the angular velocity intersecting the reference direction and forms a waveform of a detected angular velocity based on the detected vibration component, and an acceleration sensor unit provided separately from the angular velocity sensor unit. The angular velocity sensor unit includes a first sensor unit and a second sensor unit, each having the vibrator and the detection waveform-forming unit. The first sensor unit and the second sensor unit are mounted on the same substrate in a manner by which the axial direction for detecting the angular velocity defines an angle smaller than 90 degrees with respect to the direction of the gravitational acceleration so that the angular velocity waveform components produced by the sensor units are of opposite phases relative to each other and that the acceleration waveform components are in phase relative to each other.

The sensor system further includes differential waveform operation means for operating a differential waveform between the first angular velocity detection waveform of the first sensor unit and the second angular velocity waveform of the second sensor unit, and for producing, as an angular velocity signal waveform, a waveform canceling the in-phase acceleration waveform component that is superimposed on the angular velocity detection waveforms.

The sensor system further includes a second kind acceleration signal-forming unit for operating an added waveform of the first angular velocity detection waveform and the second angular velocity waveform to cancel the first angular velocity detection waveform and the second angular velocity waveform which are of opposite phases to each other, and producing the remaining in-phase acceleration waveform component as a second kind acceleration signal.

The sensor system further includes an abnormal condition-detecting unit for detecting an abnormal condition in either the angular velocity sensor unit or the acceleration sensor unit based on the second kind acceleration signal and a first kind acceleration signal. The fist kind acceleration signal is detected and produced by the acceleration sensor unit.

The angular velocity sensor outputs an angular velocity signal when an angular velocity acts on the vibrator that vibrates in the reference direction. The signal includes a vibration component stemming from the Coriolis' force in the direction for detecting the angular velocity determined to cross the reference direction (usually, at right angles). However, if an acceleration component is formed in parallel with the direction for detecting the angular velocity, the acceleration component is superimposed on the angular velocity signal to become a noise component from the standpoint of detecting the acceleration. So far, as disclosed in Japanese Patent No. 2504233, the contents of which are incorporated herein by reference, attention has been given concerning simply how to remove the acceleration component that is superimposed.

In fact, many of the vehicle control systems are employing both the angular velocity sensor and the acceleration sensor. Upon changing the conception, however, the present inventors have discovered that when the acceleration waveform component is superimposed on the vibration component that gives the output of the angular velocity sensor unit of the vibration type, the acceleration waveform component can be utilized as an acceleration signal (second kind acceleration signal) of a system different from the normal acceleration signal (first kind acceleration signal) of the acceleration sensor unit if the acceleration waveform component can be separated from the angular velocity waveform component. The acceleration signals of the two systems will exhibit nearly an equal acceleration level if the vibration-type angular velocity sensor and the acceleration sensor unit are normally operating. If either one becomes abnormal, however, the levels become out of agreement between the acceleration signals of the two systems, which, therefore, can be utilized for detecting an abnormal operation of the sensors.

Referring, for example, to the angular velocity sensor unit of the vibration type, the sensor unit of the semiconductor type will be finely affected for its zero point and sensitivity by the adhesion of even tiny foreign matter. However, the abnormal condition can be property detected by comparing the second kind acceleration signal separated from the angular velocity signal with the first kind acceleration signal which is a standard signal of the acceleration sensor unit. Further, if the second kind acceleration signal of the vibration type angular velocity sensor is used as a basis, then, it can be checked if the acceleration sensor unit is abnormally working. Further, it is possible to reliably detect an abnormal condition in the sensor system including the set of two sensor units if a discrepancy can be detected between the first kind acceleration signal and the second kind acceleration signal, although it cannot be specified which one of the vibration type angular velocity sensor unit or the acceleration sensor unit is abnormally operating.

As for the acceleration component in parallel with the angular velocity output of the vibration type angular velocity sensor unit, further, a differential signal may be found between the two angular velocity waveforms which are of opposite phases to each other to effectively cancel the acceleration component superimposed on the two waveforms in phase therewith. Moreover, the two angular velocity waveforms are finally added up together to gain an increased amplitude, making it possible to greatly decrease the effect of the acceleration component remaining in the angular velocity signal that is finally obtained.

Further, if it is considered that the acceleration waveform is nearly equivalently superimposed in phase on the two angular velocity waveforms of opposite phases, then, the two signals may be added up together instead of picking up the angular velocity waveform relying upon the differential signal thereby to cancel the angular velocity waveform components and to effectively pick up the acceleration waveform components only. In this case, the second kind acceleration signal-forming unit is constituted to include added waveform operation means which operates an added waveform of the first angular velocity detection waveform and the second angular velocity waveform, cancels the first angular velocity detection waveform and the second angular velocity waveform of phases opposite to each other, and outputs the remaining in-phase acceleration waveform component as the second kind acceleration signal waveform. This constitution offers advantages of not only improving the precision for picking up the acceleration signals but also effectively separating the acceleration signals even when the frequency of the acceleration signals to be picked up is close to the driving frequency of the angular velocity sensor unit.

Further, the first and second sensor units are so arranged on the same substrate that the axial direction for detecting the angular velocity [direction Z at right angles with both the reference direction (vibration drive direction of the vibrator) X and the direction Y for detecting the angular velocity due to the Coriolis' force] defines an angle which is smaller than 90 degrees with respect to the direction of the gravitational acceleration. The direction of acceleration detected by the first and second sensor units is in agreement with the direction of detecting the angular velocity. The direction of detecting the acceleration, too, is the same as the direction of detection though it is affected by the gravitational acceleration. Accordingly, the effect of the gravitational acceleration can be cancelled at the same time in canceling the acceleration component by taking a differential signal between the two angular velocity waveforms of phases opposite to each other. In particular, when the first and second sensor units have a structure in which the vibrator is mounted on a frame so as to vibrate via a beam, and when the vibrator, the beam and the frame are integrally formed by micro-machining the silicone substrate, the zero-point shift of the gravitational angular velocity detection waveform and the sensitivity are subject to be affected by the gravitational acceleration. The constitution of the invention, however, effectively overcomes the above inconvenience. The above effect is enhanced particularly when the first and second sensor units are so mounted on the substrate that the axial direction for detecting the angular velocity is in agreement with the direction of the gravitational acceleration.

The first and second sensor units are so mounted that one of them is on the first main surface of the substrate and the other one is on the second main surface thereof maintaining such a positional relationship that their upsides are opposite relative to each other with the direction of normal on the main surfaces of the substrate as the up-and-down direction and in a manner that the axial direction for detecting the angular velocity is in agreement with the direction of normal on the main surfaces. According to this constitution, the first and second sensor units are mounted separately on the two main surfaces of the substrate making it possible to decrease the areas of the sensor units, to constitute the mounting terminals and wire-drawing layout on the main surfaces of the substrate in a similar manner for the two units, and enabling the wirings and terminals to be shared. Further, the positions of vibration centers of the first and second sensor units can be brought close to each other in the reference direction of the vibrator suppressing dispersion in the detection of angular velocities caused by a difference in the mounting positions on the substrate. This effect is enhanced particularly when the positions of vibration centers of the first and second sensor units are brought into agreement with each other in the reference direction of the vibrator.

The acceleration sensor unit is better based on a principle of measurement different from that of the angular velocity sensor unit of the vibration type, i.e., is better the one of the non-vibration type from the standpoint of enhancing the precision of detecting the acceleration and, as a result, enhancing the precision of the first kind acceleration signal. This can be said to be more advantageous from the standpoint of detecting an abnormal condition on the second kind acceleration signal side, i.e., detecting an abnormal condition in the angular velocity sensor unit of the vibration type. As the acceleration sensor of the non-vibration type, there can be used the one of a known constitution, such as the one of the piezoelectric element type, electrostatic capacity type or the distortion gauge type.

The acceleration that takes place while driving the vehicle, in many cases, contains components of a variety of frequency bands. In many cases, therefore, the components of a particular control frequency band (e.g., 10 to 30 Hz) determined for controlling the vehicle are selectively detected. Generally, the frequency response characteristics of the second kind acceleration signals taken out from the detected vibration components of the vibration type angular velocity sensor are different from the frequency response characteristics of the first kind acceleration signals of the acceleration sensor (particularly, non-vibration type acceleration sensor). From the standpoint of enhancing the precision for detecting an abnormal condition in the vibration type angular velocity sensor unit, therefore, it is advantageous to provide the second kind acceleration signal generating unit with frequency characteristics conversion means for bringing the frequency response characteristics of the second kind acceleration signals for the second kind acceleration signal input acceleration close to the frequency characteristics of the first kind acceleration signals. The frequency characteristics conversion means can be constituted by a filter unit (e.g., the one for cutting signal components of an unnecessary band from the second kind acceleration signals).

When, for example, the acceleration sensor unit includes an acceleration detection signal-generating unit and an output filter unit of the acceleration sensor side producing the first kind acceleration signal by removing undesired waveform components from the initial waveform of the acceleration detection signal of the acceleration detection signal-generating unit, the frequency characteristics conversion means for the second type acceleration signal-forming unit may be constituted as the filter unit of the second kind acceleration signal output side having the same filter type, the same degree and the same cut-off frequency as those of the output filter unit of the acceleration sensor side. This makes it possible to decrease the deviation in the output phase between the first kind acceleration signal after having passed through the filter unit and the second kind acceleration signal and to enhance the precision for detecting the abnormal condition.

The angular velocity sensor unit and the acceleration sensor unit can be integrally incorporated in one housing (this sensor system is also called inertia sensor) By mounting the angular velocity sensor unit and the acceleration sensor unit essential for the vehicle control system in one housing, the sensor system can be easily mounted on the vehicle, and the steps of assembling can be easily standardized. Further, the angular velocity sensor unit and the acceleration sensor unit that are arranged close to each other in the same housing, bring about the following advantages.

(1) Since the angular velocity sensor unit and the acceleration sensor unit are arranged close to each other, the wiring length can be shortened for forming the first kind acceleration signals and the second kind acceleration signals and for processing the signals for detecting the abnormal condition and, in addition, the noise margin of the signals can be enhanced. In this case, it is further desired to mount the angular velocity sensor unit and the acceleration sensor unit on the same substrate.

(2) Since the detecting positions of the angular velocity sensor unit and of the acceleration sensor unit are close to each other, it is made possible to decrease the difference in the effect of sensor environment (circumstances where noise vibration occurs, mechanical resonance mode, etc.) stemming from a difference in the mounting positions, and to enhance the precision for detecting the abnormal condition.

In order that the acceleration to be detected is detected by both the angular velocity sensor unit and the acceleration sensor unit, it is necessary that the acceleration sensor unit is mounted in the housing maintaining such a positional relationship that the direction for detecting the acceleration of the acceleration sensor unit meets the direction for detecting the angular velocity of the angular velocity sensor unit (which is also the direction for detecting the acceleration) at an angle of smaller than 90 degrees. To improve the precision for detecting the abnormal condition by the comparison of the first kind acceleration signal with the second kind acceleration signal, in particular, it is desired that the environments for detecting the acceleration of the angular velocity sensor unit and of the acceleration sensor unit are close to each other as much as possible. From this point of view, it is desired that the direction for detecting the acceleration of the acceleration sensor unit is in agreement with the direction for detecting the angular velocity of the angular velocity sensor unit.

Next, the angular velocity sensor unit in the sensor system of the invention can be so constituted as to include a pair of vibrators that vibrate in opposite phases to each other in the reference direction, angular velocity operation means for operating the angular velocity based on the waveform components of opposite phases of the vibrators vibrating in opposite phases in the direction for detecting the angular velocity and for producing the angular velocity detection signals, and acceleration detecting means for operating the acceleration based on the in-phase vibration components vibrating in phase in the direction for detecting the angular velocity and for producing the second kind acceleration signals. This constitution makes it possible to detect the components of opposite phases produced by the pair of vibrators as the angular velocity signal and to detect the in-phase components as the acceleration signal and, hence, to effectively separate the angular velocity and the acceleration from each other.

Concretely speaking, the angular velocity operation unit is for operating the angular velocity by canceling the components vibrating in phase among the vibration waveforms of the pair of vibrators in the direction for detecting the angular velocity, and the acceleration operation unit is for operating the acceleration by canceling the components vibrating in opposite phases among the vibration waveforms of the pair of vibrators in the direction for detecting the angular velocity. Thus, it becomes possible to easily separate the angular velocity or the acceleration based on a simple addition or subtraction of the vibration waveforms of the two vibrators in the direction for detecting the angular velocity.

If the first kind acceleration signals and the second kind acceleration signals can be formed in the sensor system of the invention, the method of detecting the abnormal condition can be employed in a variety of forms. For example, if the abnormal condition detection unit employs a constitution for operating a differential signal between the first kind acceleration signal and the second kind acceleration signal, then, the abnormal condition detection signal can be easily formed and output based on a level of the differential signal.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENT

A preferred embodiment will now be described with reference to the drawings.

Figure 1:
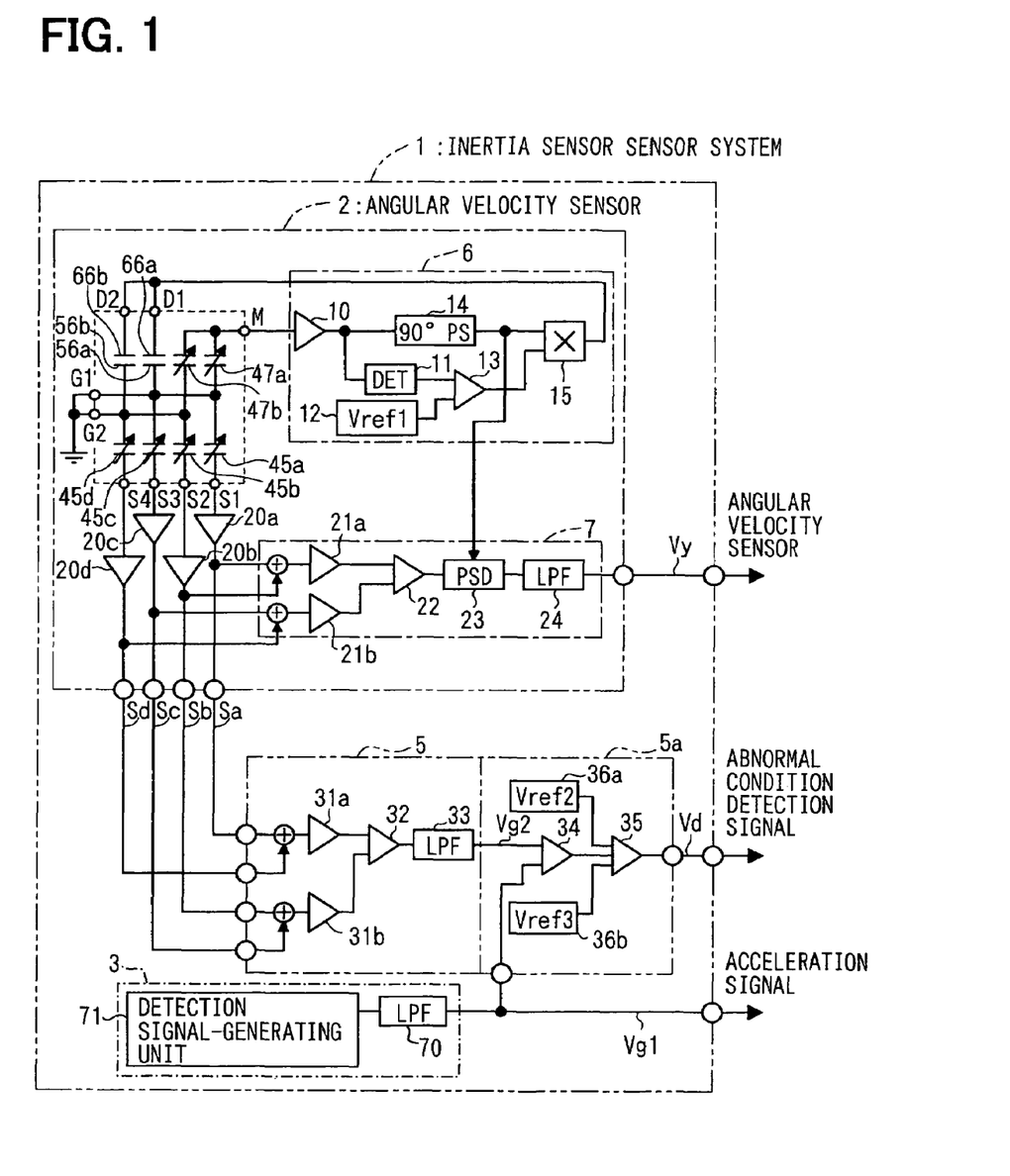
FIG. 1 is a circuit diagram illustrating an embodiment of a sensor system.

FIG. 1 is a circuit diagram of an inertia sensor system 1 according to a preferred embodiment. A major portion of the inertia sensor system 1 comprises an angular velocity sensor unit 2 and an acceleration sensor unit 3, which are incorporated in one housing 50 (or on the same substrate). The angular velocity sensor unit 2 produces an angular velocity signal Vy. The acceleration sensor unit 3 produces an acceleration signal Vg1 (first kind acceleration signal).

Figure 2:
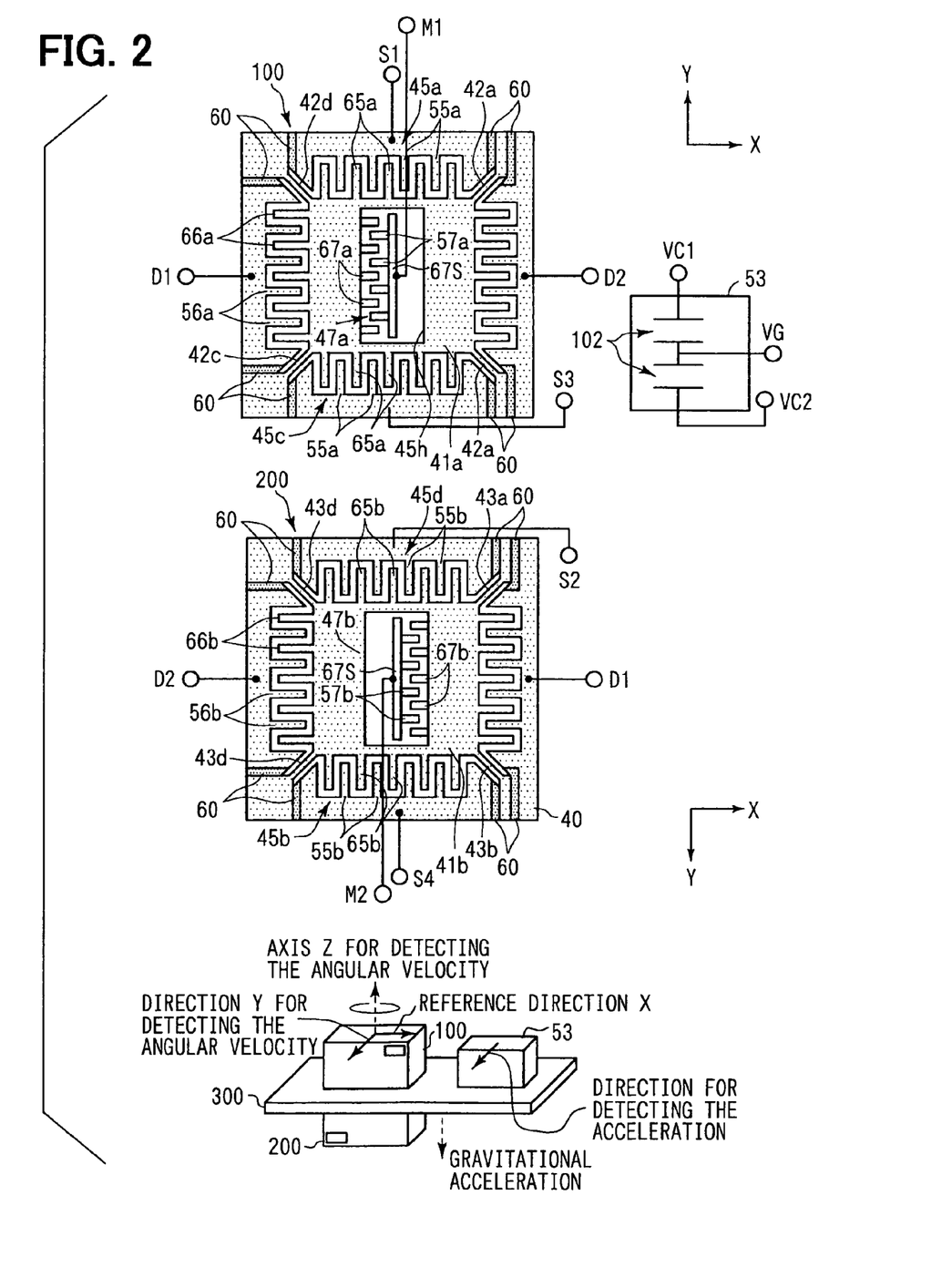
FIG. 2 is a view schematically illustrating the structure of an angular velocity sensor unit of the vibration type.

The angular velocity sensor unit 2 is constituted as an angular velocity sensor of the vibration type, and includes a first sensor unit 100, a second sensor unit 200, a vibration drive control unit 6 and an angular velocity detecting unit 7. Referring to FIG. 2, the sensor units include vibrators 41 a and 41b that vibrate in a predetermined X-direction (reference direction). Based on the vibrations in the reference detection as a result of acceleration, vibration components in a Y-direction (direction for detecting the angular velocity) perpendicular to the X-direction are detected. Concretely speaking, as shown in FIG. 1, the angular velocity sensor unit 2 detects a change in the capacity based on the detected vibration components. When acceleration is applied in parallel to the vibrators 41a and 41b, the detected vibration waveform becomes an acceleration vibration waveform superimposed on the angular velocity vibration waveform. The vibrators 41a and 41b are vibrated in opposite phases. Based on this vibration, and the reference directions and detection directions of the first sensor unit 100 and the second sensor unit 200, the detected vibration waveforms produced by the sensor units become in phase with their angular velocity waveform component and acceleration waveform component superimposed thereon. However, the detected vibration waveforms themselves have opposite phases. Thereby, the acceleration waveform component or the angular velocity waveform component may be canceled by addition or subtraction. of the first sensor unit 100 and the second sensor unit 200, the detected vibration waveforms produces by the sensor units become in phase with their angular velocity waveform component and acceleration waveform component superimposed thereon. However, the detected vibration waveforms themselves have opposite phases. Thereby, the acceleration waveform component or the angular velocity waveform component may be canceled by addition or subtraction.

In this embodiment, the first and second sensor units 100, 200 are mounted so that one is on the first main surface of the substrate 300 and the other one is on the second main surface thereof maintaining such a positional relationship that their upsides are opposite relative to each other with the direction of normal on the main surfaces of the substrate 300 as the up-and-down direction and in a manner that the axial direction (Z-direction in the drawing) for detecting the angular velocity is in agreement with the direction of normal on the main surfaces. With this arrangement, the direction for detecting the angular velocity becomes in agreement with the direction of the gravitational acceleration. In the first and second sensor units 100, 200, the center positions of vibration of the vibrators 41a and 41b in the X-direction (reference direction) are in agreement with each other. In this state, the vibrators 41a and 41b vibrate in the opposite directions in the X-direction of FIG. 2, i.e., are driven in opposite phases, whereby the angular velocities detected in the Y-direction have opposite phases and the accelerations have the same phase between the vibration-detecting capacitors 45a1 and 45a2, and between the vibration-detecting capacitors 45b1 and 45b2.

On the frames 40 of the two sensor units 100 and 200, there are mounted drive side fixed electrodes 56a, 56b of a form of comb teeth in which unit electrodes are arranged in the X-direction maintaining a predetermined gap in the Y-direction on the inner surfaces at the ends farther in the X-direction (i.e., in the direction of vibration). On the side end surfaces of the vibrators 41a and 41b in the X-direction, further, there are alternately arranged drive side moving electrodes 66a and 66b of the form of comb teeth in which the unit electrodes are arranged in the X-direction maintaining a predetermined gap in the Y-direction maintaining a gap relative to the drive side fixed electrodes 56a and 56b.

Vibration-detecting capacitors 45a, 45b, 45c and 45d are provided at the ends (a total of four places) of the two sensor units 100 and 200 in the Y-direction (i.e., in the direction for detecting the angular velocity) Concretely, on the inner surfaces at the ends of the frame 40 in the Y-direction, there are mounted detection side fixed electrodes 55a and 55b of the form of comb teeth in which the unit electrodes are arranged in the Y-direction maintaining a predetermined gap in the X-direction. On the side end surfaces of the vibrators 41a and 41b in the Y-direction, further, there are alternately arranged detection side moving electrodes 65a and 65b of the form of comb teeth in which the unit electrodes are arranged in the Y-direction maintaining a predetermined gap in the X-direction relative to the detection side fixed electrodes 55a and 55b. These detection side moving electrodes 65a, 65b and the detection side fixed electrodes 55a, 55b form the vibration-detecting capacitors 45a, 45b, 45c and 45d. Between the vibration-detecting capacitors (between 45a and 45c, between 45d and 45b) positioned on the opposite sides relative to each other in the Y-direction, there appear the angular velocity waveform component and the acceleration waveform component in opposite phases.

Further, monitoring cavities 45h in the Y-direction are formed in the vibrators 41a and 41b of the sensor units 100 and 200, and amplitude-monitoring capacitors 47a, 47b are provided in the cavities 45h for controlling the drive vibration amplitude by feedback. Concretely, electrode support stems 67s are inserted in the cavities 45h in the Y-direction. The electrode support stems 67s are fixed at the ends on the side to the frame 40 at positions which are not shown, and have, mounted on the surfaces on one side thereof, monitor side fixed electrodes 57a, 57b of the form of comb teeth in which the unit electrodes are arranged in the X-direction maintaining a predetermined gap in the Y-direction. On the corresponding side end surfaces of the monitoring cavities 45h in the X-direction, further, there are alternately arranged monitor side moving electrodes 67a and 67b of a form of comb teeth in which the unit electrodes are arranged in the X-direction maintaining a predetermined gap in the Y-direction and maintaining a gap relative to the monitor side fixed electrodes 57a and 57b. These monitor side moving electrodes 67a, 67b and the monitor side fixed electrodes 57a, 57b form the amplitude-monitoring capacitors 47a and 47b.

The electrodes 65a, 66a, 67a, 65b, 66b, 67b formed on the surfaces of the vibrators 41a and 41b are connected to the terminals G1 and G2 via beams 42b and 43c, and are connected to any external voltage (e.g., GND). On the surfaces of the frames 40 are further formed drive terminals D1 and D2 connected to the drive side fixed electrodes 56a and 56b, angular velocity-detecting terminals S1, S2, S3 and S4 connected to the detection side fixed electrodes 55a and 55b, and vibration-monitoring terminals M1, M2 connected to the monitor side fixed electrodes 57a and 57b, which are electrically isolated by isolation portions 60.

The above sensor units 100 and 200 are formed by, for example, semiconductor micro-machining of the Si substrate. In the constitution illustrated in FIG. 2, the vibrator 41a of the first sensor unit 100 is coupled by the beams 42a, 42b, 42c and 42d, and the vibrator 41b of the second sensor unit 200 is coupled by the beams 43a, 43b, 43c and 43d to the frames 40 in a manner to vibrate independently from each other in the X-direction and in the Y-direction which are at right angles with each other. Concretely speaking, the vibration structure system of frame 40, vibrator 41b and beam 42b is a one-chip integral structure together with the comb teeth-like electrode structure that will be described later by finely working the Si substrate by dry-etching technology such as high-energy plasma etching [typical application of MEMS (Micro-Electro Mechanical Systems)]. The circuit of the vibration drive control unit 6 or the angular velocity detecting unit 7 in FIG. 1 can also be integrated around the above vibration structure system relying on the known photolithography technology by utilizing the Si substrate, and the angular velocity sensor unit 2 inclusive of this circuit can be wholly fabricated as one chip.

Returning to FIG. 1, the vibration-detecting capacitors 45a, 45b, 45c and 45d are connected to capacitor voltage converters 20a, 20b, 20c and 20d which convert a change in the capacity into a voltage. An angular velocity-detecting unit 7 is constituted by summing amplifiers 21a and 21b for adding and amplifying the outputs of the capacitor voltage converters 20a, 20b and 20c, 20d, a differential amplifier 22 (differential waveform operation means) for differentially amplifying the outputs thereof, a synchronism detecting unit 23 for picking up the angular velocity component and converting it into a DC signal, and a low-pass filter 24 for removing undesired high-frequency components such as higher harmonics from the output of the synchronism detecting unit 23.

A vibration drive control unit 6 includes a capacitor voltage converter 10 for converting changes in the capacitances of the amplitude-monitoring capacitors 47a and 47b into voltages, an AC/DC converter 11 for converting a vibration AC voltage output into a direct current, a reference voltage-generating unit 12 for generating a reference voltage Vref to be compared with the output voltage of the AC/DC converter 11 as an amplitude-monitoring value, a differential amplifier 13 for amplifying a difference between the amplitude-monitoring value and the reference voltage Vref, a phase shifter 14 for shifting the phase of the vibration voltage output from the capacitor voltage converter 10 by 90 degrees, and a multiplier 15 for multiplying an output of the differential amplifier 13 by an output of the phase shifter 14. The output of the multiplier 15 is input, as a vibration drive voltage waveform, to the drive terminals D1 and D2 of the first sensor unit 100 and the second sensor unit 200.

A second kind acceleration signal-forming unit 5 for forming the second kind acceleration signal includes summing amplifiers 31a and 31b for adding and amplifying the outputs of the capacitor voltage converters 20a, 20d and 20b, 20c, a differential amplifier 32 for differentially amplifying the outputs thereof, and a low-pass filter 33 for removing undesired high-frequency components such as high frequencies from the output of the differential amplifier 32. An abnormal condition-detecting unit 5a includes a differential amplifier 34 for operating and producing a differential signal Δvg between the output (first kind acceleration signal) Vg1 of the acceleration sensor 53 of the acceleration sensor unit 3 and the output (second kind acceleration signal) Vg2 of the frequency characteristics conversion means or the low-pass filter 33 which is a filter unit on the side of the second kind acceleration signal output, and a window comparator 35 for detecting any abnormal condition in the first kind acceleration signal or in the second kind acceleration signal based on the differential signal ΔVg.

The acceleration sensor unit 3 includes an acceleration signal-generating unit 71 having a detecting unit of a known constitution such as the piezoelectric element type or electrostatic capacity type and a signal-processing circuit for forming an acceleration signal based on an output from the detecting unit. The acceleration sensor unit 3, further, has a low-pass filter 70 which is an output filter unit of the acceleration sensor side for removing undesired waveform components from the initial waveform of the acceleration detection signal of the acceleration signal-generating unit. This embodiment employs, as shown in FIG. 2, an electrostatic capacity type acceleration sensor 53 that detects the acceleration relying upon a change in the distance between the electrodes occurring in a detecting capacitor 102 accompanying the application of acceleration, i.e., detects the acceleration relying upon a change in the electrostatic capacity. The detecting capacitor 102 comprises two capacitors connected in series, the electrode on the inner side being movable, so that the electrostatic capacity of one capacitor decreases depending upon the direction of application of the angular velocity and the electrostatic capacity of the other one increases (VC1 and VC2 are terminals for applying voltages to the capacitors for controlling the detection). The acceleration signal VG is output as a change in the capacity of the detecting capacitor 102 through the output terminal that is movably connected. As will be obvious from FIG. 2, the acceleration sensor 53 is so mounted on the substrate 300 that the direction in which the electrodes of the detecting capacitor 102 are facing, i.e., the direction for detecting the acceleration, is in agreement with the direction for detecting the angular velocity of the angular velocity sensor units 100 and 200, i.e., in agreement with the Y-direction.

In the above constitution, the vibration drive control unit 6 constitutes a self-excited vibration drive mechanism in which the vibrations in the X-direction of the vibrators 41a and 41b are taken out from the monitor terminal M1, M2 as vibration-monitoring signals due to a change in the capacitances of the amplitude-monitoring capacitors 47a and 47b, converted into voltage signals through the capacitor voltage converter 10 and are fed back to the drive terminals D1 and D2. The phase shifter 14 plays the role of sustaining the mechanical vibration near a resonance point of the vibrator 41a through the beams 42a, 42b, 42c and 42d and of the vibrator 41b through the beams 43a, 43b, 43c and 43d. Further, the vibration-monitoring signal of the capacitor voltage converter 10 is separately smoothed through the AC/DC converter 11 to form an amplitude level signal, and a differential amplifier 13 operates a difference thereof from the reference voltage signal of the reference voltage-generating unit 12 corresponding to the control amplitude level. The output of the differential amplifier 13 is multiplied as an amplitude correction signal upon the vibration-monitoring signal through a multiplier 15 to control the driving amplitude to become constant. The output of the multiplier 15 is applied to the drive terminals D1 and D2 of the first sensor unit 100 and the second sensor unit 200. Therefore, the vibrators 41a and 41b in the two units 100 and 200 vibrate in the X-direction at a resonance frequency in phases opposite to each other.

In this state, when an angular velocity is input about the Z-direction (direction at right angles with the road surface when mounted, for example, on an automobile) which is perpendicular to both the X and Y-directions, the vibrators 41a and 41b produce the angular velocity vibration components in the Y-direction having an amplitude corresponding to the magnitude of the angular velocity and in phases opposite to each other due to Coriolis' force. The vibrations are detected as changes in the capacitances of the vibration-detecting capacitors 45a, 45b, 45c and 45d, taken out from the terminals S1, S2, S3 and S4, converted into voltages through the capacitor voltage converters 20a, 20b, 20c and 20d, and are output as angular velocity detection waveforms Sa, Sb, Sc and Sd.

Figure 3:
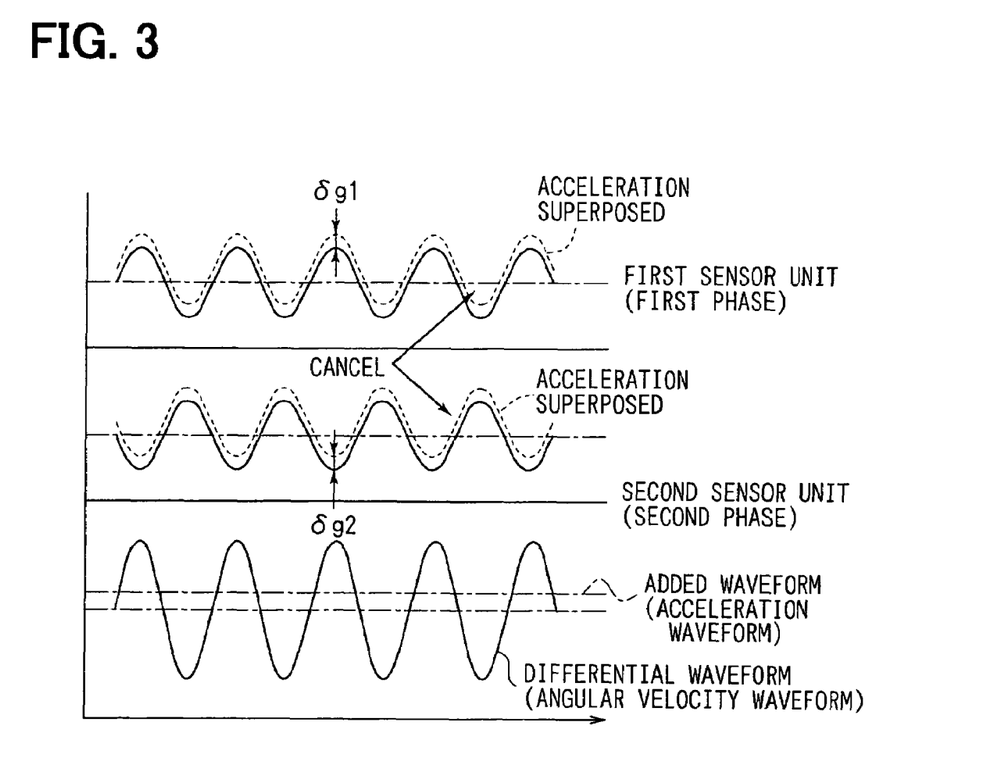
FIG. 3 is a diagram schematically illustrating the formation of an angular velocity signal waveform and a second kind acceleration waveform relying upon the detected vibration waveforms of two sensor units of the angular velocity sensor unit.

The Coriolis' forces act on the vibrators 41a and 41b in directions opposite to each other. Therefore, among the vibration-detecting capacitors 45a, 45c in the first sensor unit 100 and the vibration-detecting capacitors 45b, 45d in the second sensor unit 200, those positioned on the opposite sides relative to each other in the Y-direction produce the angular velocity detection waveforms which are in phase, i.e., the outputs Sa, Sb of the capacitor voltage converters 20a, 20b and the outputs Sc, Sd of the capacitor voltage converters 20c, 20d in the angular velocity detector unit 7 form the angular velocity detection waveforms which are in phase as shown in FIG. 3. Further, a contrivance is made such that the angular velocity detection waveforms which are in phase (signals Sa, Sb and Sc, Sd in FIG. 1) are added up for their amplitudes through the summing amplifiers 21a and 21b to enhance the angular velocity detection sensitivity. Since their accelerations assume opposite phases to each other, the waveforms Sa, Sc and Sb, Sd having angular velocities of the opposite phases of the same vibrators are separately converted into voltages through the capacitor voltage converters 20a, 20c and 20b, 20d, and are distributed through the angular velocity detector 7 or the second kind acceleration signal-forming unit 5 to pick up the angular velocity signals or the acceleration signals.

Next, in the angular velocity-detecting unit 7, the angular velocity detection wave signals Sa and Sb of the charge voltage converters 21a and 21b are in phases opposite to each other. Upon operating the difference through the differential amplifier 22, therefore, the two waveform signals are further added up for their amplitudes to further improve the angular velocity detection sensitivity. Further, as shown in FIG. 3, the two units 100 and 200 vibrating in opposite phases detect, in the opposite directions, the Coriolis' forces that are produced in the Y-direction when an angular velocity is added about the axial direction (Z-direction) for detecting the angular velocity, but detect, in the same direction, the Coriolis' forces for the acceleration which is in parallel with the Y-direction that is caused by the centrifugal force due to turning or due to abrupt vibration, forming a kind of noise component from the standpoint of the angular velocity. However, if the angular velocity detection waveform signals of the two units 100 and 200 are differentially operated, the acceleration component is cancelled and the angular velocity signal only can be taken out. As will be obvious from the direction of mounting the units 100 and 200 on the substrate 300 illustrated in FIG. 2, the direction for detecting the angular velocity while being affected by the gravitational acceleration exerted on the vibrators 41a and 42b, is in agreement with the Y-direction which is the direction for detecting the angular velocity. Therefore, the acceleration component to be cancelled includes the projection component of the gravitational acceleration on, for example, a slope. Therefore, this makes it possible to effectively eliminate such inconveniences as variation in the angular velocity output and the zero-point shift due to the gravitational acceleration, which are problems inherent in the fine units 100 and 200 manufactured by the MEMS technology.

In FIG. 1, the angular velocity signal output from the differential amplifier 22 which has been modulated for its amplitude is demodulated through the synchronism detecting unit 23, and, after ripples are removed therefrom through a low-pass filter 24, is output as a DC signal Vy which is proportional to the input angular velocity. The reference phase signal input to the synchronism detecting unit 23 is the one obtained by shifting the phase of the vibration-monitoring signal by 90 degrees, i.e., is a signal of the phase shifter 14. This is because the Coriolis's force for the input angular velocity is produced in a phase different by 90 degrees from the vibration phase of the vibrator.

Next, the angular velocity detection waveform signals Sa, Sb, Sc and Sd of the capacitor charge voltage converters 20a, 20b, 20c and 20d are also input to the second kind acceleration signal-forming unit 5. Unlike those of the angular velocity-detecting unit 7, the detection signals Sa, Sb, Sc and Sd are processed by the second kind acceleration signal-forming unit 5 in a manner that Sa and Sd are added up and amplified through the summing amplifier 31a, Sb and Sc are added up and amplified through the summing amplifier 31b, and these outputs are differentially amplified through the differential amplifier 32. As described above, the Coriolis' force due to the angular velocity acts upon the vibrators 41a and 41b in the Y-direction and in the opposite directions relative to each other, and the parallel acceleration acts upon the vibrators 41a and 41b in the Y-direction and in the same direction. As represented by a dot-dash chain line in FIG. 3, therefore, the angular velocity signal component is canceled by the operation of the signals, and the acceleration signal component only is detected as a second kind acceleration signal Vg2.

The acceleration sensor 53 incorporated in the acceleration sensor unit 3 has a direction for detecting the acceleration in the Y-direction. When the acceleration sensor 53 is normal, therefore, the first kind acceleration signal Vg1 which is an output thereof features a higher reliability of detecting the acceleration than that of the second kind acceleration signal Vg2 formed as a so-called byproduct in detecting the angular velocity. When the angular velocity sensor unit 2 is normal, on the other hand, the second kind acceleration signal Vg2 represents an acceleration detection level close to the first kind acceleration signal Vg1. Therefore, a differential signal Δvg between the first kind acceleration signal Vg1 and the second kind acceleration signal Vg2 through the differential amplifier 32 represents a value close to the neutral point. In this case, the neutral point of the differential signal is calibrated by adjusting the gain of an adjusting amplifier 36 provided on a signal passage from, for example, the adder 30 or the acceleration sensor 53 in a state where a predetermined frequency/acceleration of amplitude serving as references are being generated.

However, if the sensitivity of the angular velocity detection waveform signals Sa, Sb, Sc, Sd output from the vibration unit 4 and zero point undergo a variation due, for example, to such factors as the adhesion of tiny foreign matter on the vibration unit 4 in the angular velocity sensor unit 2, the sensitivity of the second kind acceleration signal Vg2 formed by using the above signals and the zero point undergo a variation, too, and a differential signal ΔVg from the first kind acceleration signal Vg1 of the acceleration sensor 53 detecting the real acceleration is shifted from the neutral point. Therefore, upon inputting the above differential signal ΔVg into the window comparator 35 having a reference voltage range [Vref2, Vref3] including the above neutral point, whether the differential signal ΔVg is within a specified range, i.e., whether the differential signal ΔVg is abnormal can be learned relying on an abnormal condition detection signal Vd output from the window comparator 35. Even when a malfunction occurs in the acceleration sensor 53 and the first kind acceleration signal Vg1 assumes an abnormal value, the differential signal ΔVg similarly shifts from the neutral point. When the differential signal ΔVg lies outside the reference voltage range, therefore, an abnormal condition detection signal Vd is similarly output. Here, relying upon a relationship of magnitude between the differential signal ΔVg and the neutral point, it becomes possible to roughly judge which one of the first kind acceleration signal Vg1 or the second kind acceleration signal Vg2 is abnormal. This is because, in general, adhesion of a foreign matter on the vibrator is equivalent to an increase in the mass, and the sensitivity for the acceleration tends to increase. In this case, It is recommended to provide a first comparator which produces an abnormal condition signal Vd1 on the side of the first kind acceleration signal Vg1 when ΔVg is greater than an upper-limit voltage Vref2 and a second comparator which produces an abnormal condition signal Vd2 on the side of the second kind acceleration signal Vg2 when ΔVg is smaller than a lower-limit voltage Vref3.

The second kind acceleration signal Vg2 formed from the angular velocity detection waveform signals Sa, Sb, Sc and Sd works to detect the abnormal condition highly precisely when it has frequency response characteristics (e.g., cut-off frequency, type of the filter, degree thereof) which are as close as possible to those of the acceleration sensor 3. Therefore, a low-pass filter 33 (filter unit on the second kind acceleration signal output side) is provided for removing the components in the undesired high-frequency band from the second kind acceleration signal Vg2. When, for example, the low-pass filter 70 which is the filter unit on the acceleration sensor output side has a cut-off frequency of 30 Hz in terms of the secondary Batterworth characteristics, it is desired that the tolerance of the cut-off frequency is set to be not larger than about ±10% for the filter of the same type and degree (when the tolerance is within this range, it is regarded that the cut-off frequencies of the two filters 33 and 70 are substantially the same). This is because the phases of Vg1 and Vg2 that are output can be brought into agreement for the acceleration that is input, reducing the error in finding the difference.

Accordingly, the acceleration of the vehicle such as an automobile mounting, for example, the inertia sensor system 1 is formed as the second kind acceleration signal Vg2 by using a signal of the angular velocity sensor unit 3 constituted as the vibration type angular velocity sensor, and is compared with the first kind acceleration signal Vg1 of the acceleration sensor 53 that is detecting the real acceleration, thereby to utilize the second kind acceleration signal Vg2 as the data reflecting the normal degree of the angular velocity sensor unit 3. This offers an excellent effect of highly precisely detecting an abnormal condition of even a slight variation in the zero point and sensitivity of the acceleration sensor unit 53 (FIG. 2) that could not be detected so far. Besides, a comparison with an output of the acceleration sensor unit 53 offers an advantage of detecting an abnormal condition in the acceleration sensor unit 3, too.

The invention claimed is:
1. A sensor system comprising:
an angular velocity sensor unit comprising a first sensor unit and a second sensor unit, each of which comprises a vibrator which vibrates in a predetermined reference direction and a detection waveform-forming unit which detects a vibration component in a predetermined direction for detecting an angular velocity intersecting the predetermined reference direction and forms a waveform, of a detected angular velocity based on the vibration component, wherein the first sensor unit and the second sensor unit are mounted on a same substrate so that an axial direction for detecting the angular velocity defines an angle equal to or less than 90 degrees with the direction of gravitational acceleration, wherein waveform components produced by the first and second sensor units are of opposite phases relative to each other and acceleration waveform components are in phase relative to each other;
an acceleration sensor unit provided separately from the angular velocity sensor unit;
differential waveform operation means for differentially amplifying the first angular velocity detection waveform of the first sensor unit and the second angular velocity waveform of the second sensor unit, and for producing an angular velocity signal waveform canceling the in-phase acceleration waveform component superposed on the angular velocity detection waveforms;
a second kind acceleration signal-forming unit for additionally amplifying the first angular velocity detection waveform and the second angular velocity waveform to cancel the first angular velocity detection waveform and the second angular velocity waveform which are of opposite phases to each other, and producing a second kind acceleration signal comprised of remaining in-phase acceleration waveform component; and an abnormal condition-detecting unit for detecting an abnormal condition in either the angular velocity sensor unit or the acceleration sensor unit based on the second kind acceleration signal and a first kind acceleration signal which is the acceleration signal detected and produced by the acceleration sensor unit.

2. A sensor system according to claim 1, wherein the first and second sensor units have a structure in which the vibrator is mounted on a frame so as to vibrate via a beam the vibrator, the beam and frame being integrally formed by micro-machining the silicone substrate.

3. A sensor system according to claim 1, wherein the first and second sensor units are mounted on the substrate so that an axial direction for detecting the angular velocity is in agreement with direction of gravitational acceleration.

4. A sensor system according to claim 3, wherein one of the first and second sensor units is mounted on the first main surface of the substrate and the other is mounted on the second main surface, wherein a positional relationship between the first and second sensor units is maintained so that their upsides are apposite relative to each other with the direction of normal on the main surfaces of the substrate and in a manner so that the axial direction for detecting the angular velocity is in agreement with the direction of normal on the main surfaces.

5. A sensor system according to claim 4, wherein the first and second sensor units are arranged maintaining such a relationship that null positions of the vibrators are brought into agreement with each other in the reference direction of the vibrators.

6. A sensor system according to claim 1, wherein the acceleration sensor unit is constituted as a non-driving type acceleration sensor, wherein the acceleration sensor unit further comprises a filtering unit for filtering high-frequency components out of a response frequency band of the vibration type angular velocity sensor from the acceleration signals.

7. A sensor system according to claim 1, wherein the angular velocity sensor unit and the acceleration sensor unit are incorporated in a housing.

8. A sensor system according to claim 7, wherein the acceleration sensor unit is mounted in the housing maintaining such a positional relationship that the direction for detecting the acceleration meets the direction for detecting the angular velocity of the angular velocity sensor unit at an angle of smaller than 90 degrees.

9. A sensor system according to claim 8, wherein the acceleration sensor unit is mounted on the same substrate such that the direction for detecting the acceleration is in agreement with the direction for detecting the angular velocity of the angular velocity sensor unit.

10. A sensor system according to claim 1, wherein the differential waveform operation means is for producing the angular velocity by canceling the components vibrating in phase among the vibration waveforms of the pair of vibrators in the direction for producing the angular velocity, and the second kind acceleration signal-forming unit is for detecting the second kind acceleration by canceling the components vibrating in opposite phases among the vibration waveforms of the pair of vibrators in the direction for detecting the angular velocity.

11. A sensor system according to claim 10, wherein the abnormal condition detecting unit differentially amplifies the first kind acceleration signal and the second kind acceleration signal, and forms and produces an abnormal condition detection signal based on a level of the differential signal.

* * * * *